United States Patent [19] [11] 3,761,905
Hollstein, Jr. et al. [45] Sept. 25, 1973

[54] DISC PACK DEFECT DETECTION SYSTEM

[75] Inventors: Carl P. Hollstein, Jr.; Robert L. Cloke, both of San Jose, Calif.

[73] Assignee: Information Storage Systems, Inc., Cupertino, Calif.

[22] Filed: Aug. 20, 1971

[21] Appl. No.: 173,514

[52] U.S. Cl. .................... 340/174.1 H, 340/174.1 B
[51] Int. Cl. .................... G11b 5/44
[58] Field of Search .............. 340/174.1 B, 174.1 G, 340/174.1 H

[56] References Cited

UNITED STATES PATENTS

| | | | |
|---|---|---|---|
| 3,096,511 | 7/1963 | Taras | 340/174.1 B |
| 3,579,211 | 5/1971 | Larsen | 340/174.1 B |
| 3,653,011 | 3/1972 | Donohue et al. | 340/174.1 B |
| 3,474,331 | 10/1969 | Chur | 340/174.1 B |
| 3,656,125 | 4/1972 | Kanda et al. | 340/174.1 B |
| 3,510,857 | 5/1970 | Kennedy et al. | 340/174.1 B |

*Primary Examiner*—Vincent P. Canney
*Attorney*—C. Michael Zimmerman et al.

[57] ABSTRACT

A method and system are described for detecting defective surface areas in magnetic recording discs. Detection is effected during initialization of a disc pack before data is recorded thereon for storage, therby permitting defective areas to be subsequently avoided during data storage. The method includes the steps of producing a reference signal from the readback signal derived from a recording disc during initialization thereof, and of comparing the contemporaneous or instantaneous value of the readback signal with the value of the reference signal to detect any abrupt reduction in the value of the readback signal. The duration of any such reduction is measured, and whenever it exceeds a predetermined time period, a defect signal is developed which interrupts the initialization process and is used to prevent later use of the defective area represented by the abrupt reduction. The system includes amplification, rectification, timing, and output circuits which process the readback signals and produce the defect signals in the manner described. It further includes a peak hold circuit and voltage divider for producing a reference signal based on the peak value of the readback signals but reduced to a fixed percentage thereof. A comparator circuit continuously compares such reference signal with the value of the contemporaneous readback signal for the purpose of detecting any such abrupt reduction in the latter to a value below that of the reference signal.

10 Claims, 5 Drawing Figures

INVENTORS
Carl P. Hollstein, Jr.
BY Robert L. Cloke
ATTORNEY

INVENTORS
Carl P. Hollstein, Jr.
BY Robert L. Cloke
C. Michael Zimmerman
ATTORNEY

DISC PACK DEFECT DETECTION SYSTEM

BACKGROUND OF THE INVENTION

This invention relates to data storage and retrieval systems and, more particularly, to a method of and system for detecting defective areas or surface defects in a recording surface used in data storage devices.

Disc packs comprising a plurality of individual magnetic recording discs are tested for recording surface defects by the manufacturers thereof before being distributed for use in data storage devices. In the past, it has been customary to test the discs for defects which would interfere with a recording density of the order of 100 lines or tracks per radial inch along the surface. Recently, however, techniques have been devised that make it feasible to record data at significantly greater densities and to retrieve or read back this data. For example, densities in the range of 200 lines per radial inch are now feasible. As a consequence, the manufacturers' certification that their products are defect-free is no longer an index of the quality of such recording discs, because surface irregularities that do not constitute defects at a recording density of 100 tracks per inch are intolerable at the higher density rates noted.

Further, it would be advantageous to test or check magnetic recording discs for defects during initialization when first installed in a recording apparatus to thereby obviate the requirement for a separate or independent test procedure, assuming that one of adequate quality could be or would be used by manufacturers, and in the absence thereof permitting defective areas to be located and skipped or avoided, thereby permitting otherwise defective discs to be used without reducing the quality of the data storage.

SUMMARY OF THE INVENTION

In view of the foregoing, an object, among others, of the present invention is to provide an improved method of and system for detecting defective areas in data storage surfaces, and especially for detecting any such defective areas during initialization of the storage device so that such areas can be avoided for data storage.

In the accomplishment of this general objective, the system is used in association with a memory device which may be a random access memory device arranged with an on-line computer or central processing unit through a system control unit. Such central processing unit is programmed to check or test each recording surface by writing or recording a predetermined pattern thereon and then reading the pattern. The system comprising the present invention is provided as a part of such memory device, and is operative to continuously evaluate the value of amplitude of the readback signal from the recording surface, and to produce a defect signal and deliver it to a readback network to disable the same, whenever the value of such readback signal falls below a predetermined level, thereby forcing an error condition onto the central processing unit, causing it to note the location of such defective area so as to avoid subsequent recording of data thereat.

This function is achieved both in method and system terms by producing a reference signal and continuously comparing the contemporaneous or instantaneous value of the readback signal with the reference signal so as to sense any abrupt reduction in the value of the latter. Should any such abrupt reduction fall below a predetermined value for a duration in excess of a predetermined time interval, a defect signal is produced which is transmitted to the readback network of the data storage device to disable the data transfer process.

As the specification continues, a number of particular objects and advantages of the invention, especially as concerns specific details and characteristics thereof, will become apparent.

BRIEF DESCRIPTION OF THE DRAWINGS

With reference to the accompanying two sheets of drawings.

Figure 1:
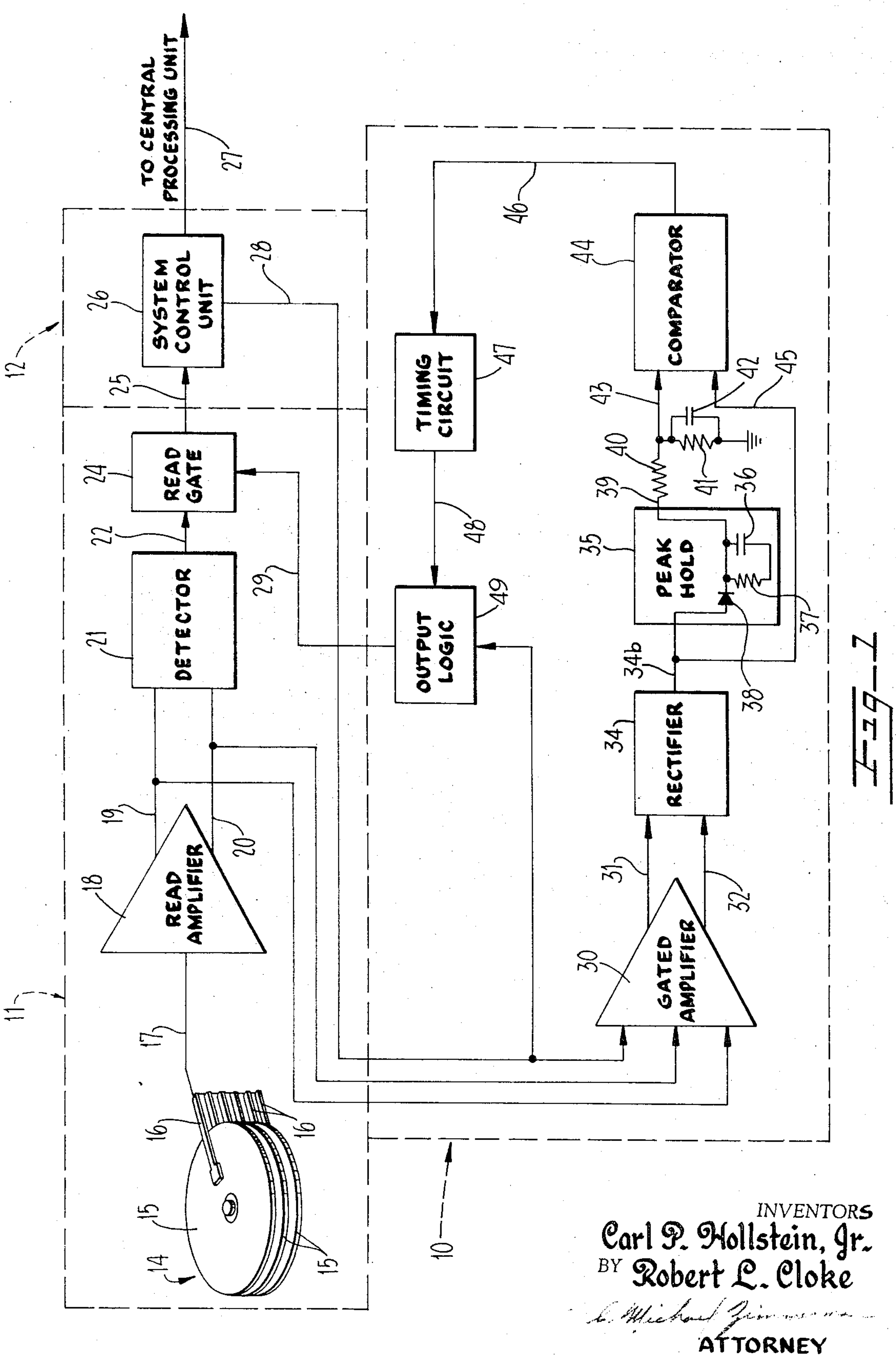
FIG. 1 is a block diagram illustrating a preferred embodiment of a defect detection system embodying the invention in operative association with a readback network of a random access memory device and system control unit arranged therewith.

The functional association illustrated in FIG.1 is conveniently divisible for descriptive purposes into a defect detector or defect detection system with which the invention is particularly concerned, a random access memory device with which the defect detector has particular utility, and a system control unit connected with the data storage device to receive the readback output therefrom and deliver the same to a central processing unit or computer which is not shown. Such subdivision is depicted in FIG.1 by the rectangular broken-line boundaries respectively enclosing certain of the components shown in this Figure. For identification, the defect detector is denoted in its entirety with the numeral 10, the data storage device is identified with the numeral 11, and the system control unit is denoted 12.

It should be noted that for purposes of the present invention, both the data storage device 11 and system control unit 12 may be completely conventional and operate to perform the standard functions ordinarily characterizing the same. In this respect, the memory 11 includes a data storage device in the form of a disc pack 14 comprising a plurality of individual magnetic recording discs 15 arranged in spaced apart relation to permit association with a plurality of data transfer devices in the form of read/write heads 16. The disc pack 14 is rotatably driven by mechanism (not shown), and the transfer devices 16 are displaced radially with respect to the discs 15 to locations or addresses at which information is either to be recorded or from which it is to be read.

The data transfer devices 16 are connected via a signal line 17 to the input of an amplifier 18 operative to produce at the output terminals 19 and 20 thereof amplified sine wave type signals representative respectively, of the clock or location pulses and data or information pulses delivered to the amplifier on the signal line 17. By way of example, the input signals to the amplifier 18 may be of the order of 5 millivolts, and the signals appearing at the output lines 19 and 20 may be increased in value to 80 to 100 millivolts. The signal lines 19 and 20 are connected to a detector 21 which processes such signals and delivers the same via a line 22 to a read gate 24.

As heretofore stated, the described arrangement comprising the memory device 11 is standard, and the output signal developed by the read gate 24 appears on an output signal line 25 which is adapted to be connected to the equipment usually associated with a data storage device. In this connection, a system control unit, such as represented in FIG.1 at 26, is connected with the read gate 24 at the output signal line 25 thereof. The system control unit 26 is provided with an output signal line 27 adapted to be connected to a central processing unit which, for purposes hereof, may be taken to be an on-line computer. Such central processing unit is programmed to deliver a check or test pattern onto the discs 15 of the disc pack 14 through the system control unit 26, and such test pattern constitutes the readback signal utilized by the defect detector 10, as will be described in detail hereinafter.

The system control unit 26 has an output signal line 28 connected with the defect detector 10 to deliver an enabling signal thereto which controls its operation. Conversely, the read gate 24 is adapted to receive signals from the defect detector 10 through a signal line 29 to disable the read gate and thereby interrupt the transfer of readback signals to the control unit 26 to force a data check error. The memory device 11 and system control unit 12 are sometimes combined hereinafter and generally referred to as a "readback network".

The defect detector 10 includes a gated amplifier 30 defining the input stage of the detector. The amplifier 30 can be a difference transistor amplifier and is connected via branches of the signal lines 19 and 20 to the output terminals of the amplifier 18 so as to receive the amplified signal representations produced thereby of both the clock and data pulses constituting the readback signal. Desirably, the amplifier 30 ordinarily has a high impedance input making it inoperative and effectively isolating it from the memory device 11. However, it is connected to the output signal line 28 of the system control unit 26 so as to receive enabling signals therefrom which gate the amplifier to its "on" or operative condition in which it processes the signal pulses delivered thereto from the signal lines 19 and 20.

Output signals from the gated amplifier 30 are transferred via signal lines 31 and 32 to the input terminals of a full-wave rectifier 34 which, after rectification, sums or combines such signals and delivers the same to a peak hold circuit 35. The peak hold circuit essentially comprises a shunt capacitance storage network as exemplified by the by the capacitor 36 and the resistance 37; in series with a diode 38. The storage network is charged essentially to the peak value of the unipolar pulses received thereby, and the discharge time constant for the capacitance is relatively long so that its discharge rate is very slow compared to its charging rate.

The signal appearing on the output line 39 of the peak hold circuit 36 may be taken to be an intermediate reference signal derived by processing the readback signal and having a value approximating the peak value of the readback signal (i.e., the peaks of the rectified form thereof delivered to the peak hold circuit) which is reduced in value through a voltage divider exemplified by the resistances 40 and 41 and smoothing capacitance 42 to produce on the input signal line 43 of a comparator circuit 44 a reference signal based on the peak value of the readback signal and constituting a fixed or predetermined percentage thereof which, by way of example, may be of the order of 20 percent of the peak value. The comparator 44 has a second input 45 connected to the output of the rectifier 34 to receive at such input the contemporary or instantaneous rectified readback signal. The comparator 44 continuously compares the contemporaneous or instantaneous value of the readback signal with the reference signal appearing on the line 42; and whenever the value of the contemporaneous readback signal falls below the value of the reference signal, this signal information is delivered over a signal line 46 to a timing circuit 47.

The timing circuit 47 may take the form of a capacitance network operative to produce a signal on the output line 48 leading to one input of an output logic circuit 49 such as an AND gate, which is also connected to the enabling line 28. Such output logic responds to the aforesaid signal information from the comparator by transmitting a disabling or defect signal via the line 29 to the read gate 24 which causes the read gate to interrupt the transfer of data pulses to the control unit 26 from the disc pack 14. As long as any abrupt reduction in the value of the contemporaneous readback signal delivered to the comparator circuit 44 does not exceed a predetermined duration as measured by the timing circuit 47, no change in the condition of the output logic circuit 49 is effected. By way of example, a time duration in excess of about 400 nano-seconds may be taken as a time duration which, if exceeded, will cause a defect signal to be transmitted from the output logic circuit 49 to the read gate 24.

Figure 2:
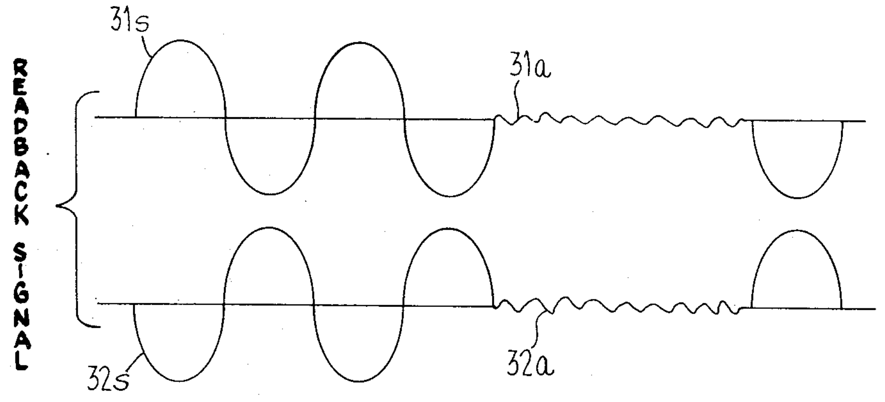
FIG.2 through 5 are curves respectively representing signals appearing at various locations along the system illustrated in FIG. 1.

The function of the defect detection system 10 is represented by the curves shown in FIGS.2 through 5 in terms of typical signal voltages at various locations in the system. Referring thereto, the signals representative of the clock and data components of the readback signal appearing at the output of the gated amplifier 30 are shown in FIG.2. In each instance, these signals are alternating current signals having positive and negative peaks of generally sinusoidal configuration defined about zero voltage axes. For identification, the two signals may be assumed to appear on the signal lines 31 and 32 and are respectively denoted with the numerals 31*s* and 32*s*. Ordinarily, the readback signal components have the peak amplitudes denoted along the first section of the zero voltage line but may experience abrupt reductions in their value in the event of the presence of a defect in the recording surface of a magnetic recording disc from which the signal is being read. Such an abrupt change (i.e., reduction) is denoted for identification with the numerals 31*a* and 32*a*, respectively.

Figure 3:
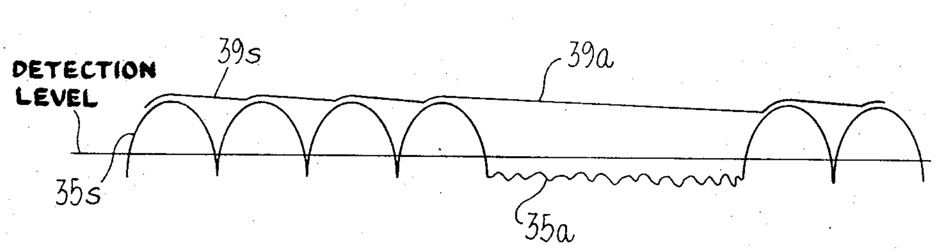

FIG.3 illustrates the output signal from the rectifier 34 appearing on the signal line 346 thereof, and such signal is denoted with the numeral 35*s*. It is seen to comprise a succession of unipolar pulses referenced to the "detection level" of the rectifier which is denoted with a horizontal line identified by this indicia. The character of the signal appearing on the output signal line 39 of the peak hold circuit 36 is superposed for convenience in FIG.3 upon the pulsating signal 35 and is denoted with the numeral 39*s*. Comparing the signals 35*s* and 39*s*, it is seen that the latter has a peak value approximating that of the enlarged peaks of the signal 35*s* and that the signal 39*s* tends to decrease slightly between successive pulses of the signal 35*s*. That is to say, the capacitance network comprised in the peak hold circuit 35 tends to slowly discharge and, therefore, loses some of its value between successive pulses. However, comparing the values of the signal areas 35*a* and 39*a* which correspond to a sudden reduction in the value of the readback signal denoted by the areas 31*a* and 32*a* in FIG.2, it is evident that whereas the contemporaneous or instantaneous value of the rectifier output signal immediately falls below the detection level in response to any sudden reduction in the value of the readback signal, the signal 39*s* very slowly decreases in value throughout the area 39*a* thereof. Accordingly, a relatively constant or uniform reference signal is derived from this intermediate reference signal 39*s* for comparison with the contemporaneous or instantaneous value of the readback signal.

Figure 4:
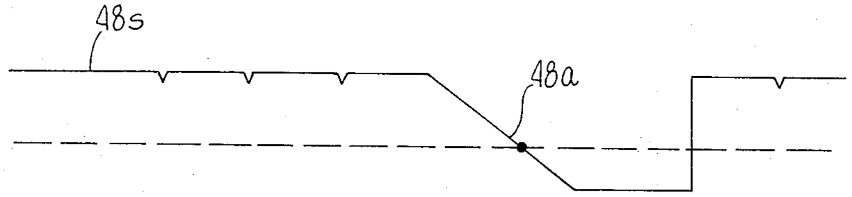

In FIG.4 the character of the output signal appearing on the signal line 48 interconnecting the timing circuit 47 and output circuit 49 is illustrated, and this signal is denoted with the numeral 48*s*. As long as the readback signals from the disc pack 14 are normal the output signal 48*s* has a relatively constant value with very minor fluctuations corresponding to the nulls between successive rectified pulses 35*s*, as shown in FIG.3. By way of example, the value of the signal 48*s* may be about +5.0 volts DC. Whenever the readback signal is abruptly reduced in value, the signal 48*s* is correspondingly reduced in value, and the rate of its reduction is determined by circuit parameters. Such rate of reduction and the threshhold value to which the output logic circuit 49 is set, determines the time duration that such abrupt reduction in the readback signal is accommodated before an error signal is delivered to the read gate 24.

Figure 5:
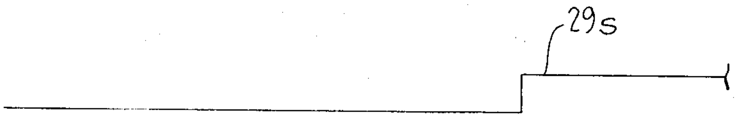

In the particular system being considered, the threshhold is indicated by the broken line in FIG.4 and, for example, may be about −0.7 volts DC. When the signal 48*s* diminishes in value (as shown along the segment 48*a*), and crosses the threshhold value, a defect signal is developed by the output logic circuit 49, as illustrated in FIG.5. For identification, the defect signal depicted in FIG.5 is denoted with the numeral 29*s*, and it constitutes a positive pulse of generally square-wave form having a duration of sufficient length to close the read gate for the time necessary to cause an "error check" of the track responsible for the defect signal.

The defect detection system therefore functions to detect any surface defects in a data storage device such as a magnetic recording disc which cause a reduction in the value or amplitude of the readback signal delivered to the detection system from the readback network with which the system is associated. Detection of such defects causes the defective areas to be "flagged" during disc pack initialization so that such defective areas are not used for data storage.

While in the foregoing specification an embodiment of the invention has been set forth in considerable detail for purposes of making a complete disclosure thereof, it will be apparent to those skilled in the art that numerous changes may be made in such details without departing from the spirit and principles of the invention. For example, although the invention has been particularly described in combination with disc pack types of memories, it will be apparent that it can also be used to detect recording surface defects in other types of memories, such as magnetic tape memories.

We claim:

1. In a method for detecting defective areas in the recording surface of data storage devices during initialization thereof to permit such areas to be avoided for data storage, the steps of producing a readback signal from said recording surface, producing a reference signal of predetermined value by processing said readback signal to provide a threshold based upon a percentage of the maximum value of said readback signal, comparing the value of the readback signal with the value of said reference signal to detect any abrupt reduction in the value of the readback signal, measuring the duration of any such abrupt reduction in the value of the readback signal, and in response to the presence of a value reduction having a duration in excess of a predetermined interval and a magnitude less than said threshold, producing a defect signal operative to interrupt the initialization process and prevent data recording at the defective area represented by the abrupt reduction in the value of the readback signal during use of the surface for data storage.

2. In a method for detecting defective areas in the recording surface of data storage devices during initialization thereof to permit such areas to be avoided for data storage, the steps of producing a readback signal from said recording surface, producing a reference signal of predetermined value by processing said readback signal by developing an intermediate signal corresponding to the peak value of the readback signal over a number of cycles thereof, and reducing the value of such intermediate signal to a fixed percentage of such peak value of the readback signal to produce said reference signal, comparing the value of the readback signal with the value of said reference signal to detect any abrupt reduction in the value of the readback signal, measuring the duration of any such abrupt reduction in the value of the readback signal, and in response to the presence of a value reduction having a duration in excess of a predetermined interval, producing a defect signal operative to interrupt the initialization process and prevent data recording at the defective area represented by the abrupt reduction in the value of the readback signal during use of the surface for data storage.

3. The method of claim 1 in which the readback signal from such data storage device is continuously processed, said reference signal being the product of a plurality of successive cycles of the readback signal whereas the contemporaneous value compared therewith is comprised of a limited number of cycles.

4. The method of claim 1 in which said readback signal is an alternating current signal, and including the further step of converting the readback signal into a unipolar signal prior to producing said reference signal and the value of the readback signal for comparison therewith.

5. The method of claim 4 in which said readback signal includes representations of both clock and data pulses, and in which the step of converting the readback signal to unipolar includes combining the representations of the clock and data pulses into a composite unipolar signal.

6. The method of claim 5 in which the step of processing the readback signal to produce a reference signal therefrom includes developing an intermediate signal corresponding to the peak value of the readback signal over a number of cycles thereof, and reducing the value of such intermediate signal to a fixed percentage of such peak value of the readback signal to produce said reference signal, and in which the readback signal from such surface is continuously processed, said reference signal being the product of a plurality of successive cycles of the readback signal whereas the contemporaneous value compared therewith is comprised of a limited number of cycles.

7. In combination with a random access memory device having a readback network, a defect detection system for locating defective areas in a data recording surface during initialization thereof to permit such areas to be avoided for data storage, comprising: means for producing a reference signal of a predetermined value to provide a threshold based upon a percentage of the maximum value of said readback signal, a comparator circuit for comparing such reference signal with the value of the readback signal to detect any abrupt reduction in the value of the readback signal, a timing circuit connected with said comparator circuit and operative to measure the duration of any such abrupt reduction in the value of the readback signal, and an output circuit connected with said timing circuit and operative in response to the presence of a value reduction measured thereby having a duration in excess of a predetermined interval and a magnitude less than said threshold to produce a defect signal and transmit the same to said readback network to interrupt the initialization process and prevent data recording at the defective area represented by the abrupt reduction in the value of the readback signal during use of the surface for data storage.

8. The combination of claim 7 in which said means for producing a reference signal includes a peak hold circuit comprising a capacitance storage network provided with a relatively long discharge time constant, the capacitance storage network being charged by the peak value of the readback signal pulses delivered thereto, and the reference signal being based on the value to which said capacitance storage circuit is charged.

9. The combination of claim 8 in which said means for producing a reference signal further includes a voltage divider preceding the input to said comparator circuit to reduce the value of the reference signal to a predetermined percentage of the peak value to which said capacitance storage network is charged.

10. The combination of claim 7 in which said means for producing a reference signal further includes a gated amplifier connected with said readback network so as to receive therefrom signals representative of both the clock and data pulses comprising the readback signal, and a full-wave rectifier connected with said gated amplifier so as to receive therefrom amplified replicas of said signals representative of the clock and data pulses, said rectifier being operative to produce a composite output signal from said representative signals and deliver the same to said peak hold circuit, said amplifier being adapted to have enabling signals delivered thereto to change the condition thereof from an inoperative, high impedance input condition to an operative state to process the readback signals from said readback network.

* * * * *